3,306,892
PROCESS FOR THE PRODUCTION OF 6,8-DIDE-OXY - 6 - (1,4-DIALKYL-L-2-PYRROLIDINE-CARBOXAMIDO) - 1 - THIO-D-ERYTHRO-α-D-GALACTO-OCTOPYRANOSIDES
Barney J. Magerlein, Portage, Mich., assignor to The Upjohn Company, Kalamazoo, Mich., a corporation of Delaware
No Drawing. Filed Dec. 21, 1964, Ser. No. 420,099
8 Claims. (Cl. 260—210)

This invention relates to a novel process for the production of S-substituted 6,8-dideoxy-6-(1,4-dialkyl-L-2-pyrrolidine-carboxamido)-1-thio-D-erythro-α-D - galacto-octopyranosides and the 7-O-methyl derivatives thereof, of which the most notable member is lincomycin (U.S. Patent 3,086,912), methyl 6,8-dideoxy-6-(1-methyl-trans-4 - propyl-L-2-pyrrolidinecarboxamido)-1-thio-D-erythro-α-D-galacto-octopyranoside having the formula:

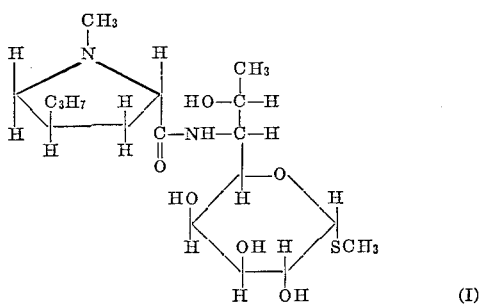

The novel process of this invention can be illustratively represented by the following formula:

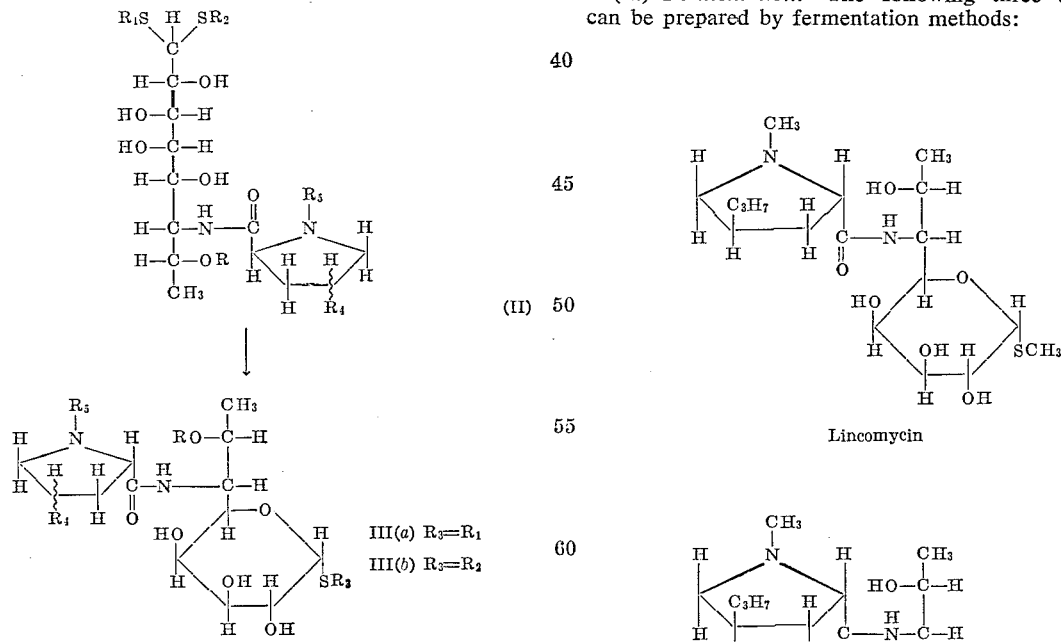

wherein R is selected from the group consisting of hydrogen and methyl, wherein $R_1$ and $R_2$ are selected from the group consisting of alkyl radicals having from 1 to 18 carbon atoms, inclusive, and benzyl and 2-thenyl, wherein $R_4$ and $R_5$ are alkyl radicals having from 1 to 12 carbon atoms, inclusive, and wherein $R_3$ is selected from the group consisting of $R_1$ and $R_2$.

The wavy line indicates that the group $R_4$ can be cis (on the same side of the ring) or trans (opposite of the ring) to the carboxyl group of the proline moiety.

The process of the present invention comprises: heating to reflux a solution containing an N-(1,4-dialkylprolyl)lincosamine substituted mercaptal of Formula II in the presence of a strong acid or, alternatively, heating a substituted mercaptal of Formula II to obtain an S-substituted N-(1,4-dialkylprolyl)-α-thiolincosaminide of either Formula III(a) or III(b).

The process of this invention is suitable for preparing the newly discovered antibiotic lincomycin described in U.S. Patent 3,086,912 from other related antibiotics such as lincomycin C. Lincomycin C, which is ethyl 6,8-dideoxy-6-(1-methyl-trans-4-propyl-L - 2 - pyrrolidinecarboxamido) - 1 - thio -D-erythro-α-D-galacto-octopyranoside, gives by treatment with excess methyl mercaptan, as shown in Preparation 21, a dimethyl mercaptal corresponding to Formula II wherein $R_1$ and $R_2$ are methyl, R is hydrogen, $R_4$ is propyl, and $R_5$ is methyl. This compound, when heated above the melting point or refluxed in solution with an acid, provides lincomycin. Other lincomycin analogs can be produced by selecting starting materials of Formula II in which the parameters R through $R_5$ are selected as further shown in the examples and preparations. The S-butyl analog of lincomycin (Example 4) has shown increased activity over lincomycin as an antibacterial agent. It is, therefore, of interest to employ the present method for the production of lincomycin-like antibiotics with increased activity, increased antibiotic spectra, or more specific antibiotic activity against selected pathogenic microorganisms.

The starting materials of Formula II of this invention are prepared by a combination of fermentation (A) and chemical methods (B).

(A) *Fermentation.*—The following three antibiotics can be prepared by fermentation methods:

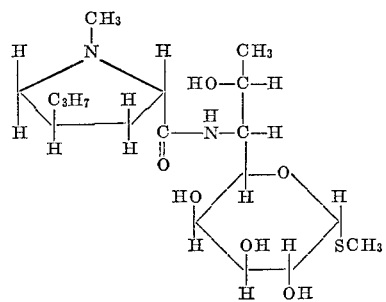

Lincomycin

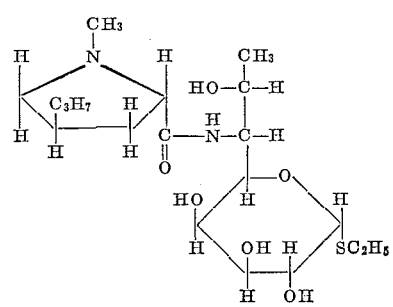

Lincomycin C

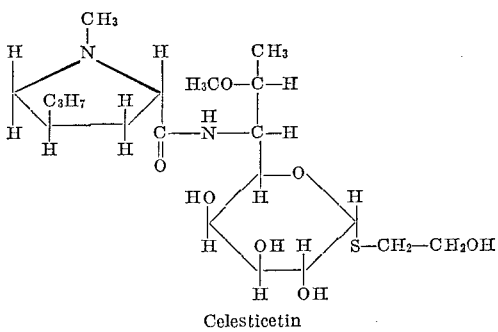

Celesticetin

Lincomycin is prepared by a fermentation process with *Streptomyces lincolnensis* var. *lincolnensis* as shown in U.S. Patent 3,086,912.

Celesticetin is prepared by a fermentation process using *Streptomyces caelestis* as shown in U.S. Patent 2,928,844.

Lincomycin C is prepared as shown in Preparation 1 below:

PREPARATION 1

*Lincomycin C and its hydrochloride*

FERMENTATION

A soil slant of *Streptomyces lincolnensis* var. *lincolnensis*, NRRL 2936, was used to inoculate a series of 500-ml. Erlenmeyer flasks, each containing 100 ml. of seed medium consisting of the following ingredients:

| | |
|---|---|
| Yeastolac [1] _____ g__ | 10 |
| Glucose monohydrate _____ g__ | 10 |
| N–Z-amine B [2] _____ g__ | 5 |
| Tap water, q.s. _____ l__ | 1 |

[1] Yeastolac is a protein hydrolysate of yeast cells.
[2] N-Z-amine B is Sheffield's enzymatic digest casein.

The seed medium presterilization pH was 7.3. The seed was grown for 2 days at 28° C. on a Gump rotary shaker operating at 250 r.p.m.

A 5% inoculum of the seed described above (5 ml.) was added to each of 30 500-ml. Erlenmeyer flasks each containing 100 ml. of the following fermentation medium:

| | |
|---|---|
| Glucose monohydrate _____ g__ | 15 |
| Starch _____ g__ | 40 |
| Molasses _____ g__ | 20 |
| Wilson's Peptone Liquor No. 159 [1] _____ g__ | 10 |
| Corn steep liquor _____ g__ | 20 |
| Calcium carbonate _____ g__ | 8 |
| Lard oil _____ ml__ | 0.5 |
| Tap water, q.s. _____ l__ | 1 |

[1] Wilson's Peptone Liquor No. 159 is a preparation of enzymatically hydrolyzed proteins from aminal origin.

At the time of inoculation, DL-ethionine was added to a final concentration of 2 mg./ml.

The shake flasks were harvested after 4 days of fermentation at 28° C. on a Gump rotary shaker at 250 r.p.m. They assayed 200 mcg./ml. on the *S. lutea* assay, hereinafter described. The whole beer solids was about 20 g./liter.

In a similar manner, fermentations were run with L-ethionine substituted for DL-ethionine, and D-ethionine substituted for DL-ethionine.

PURIFICATION

Whole beer (235 l.) from a DL-ethionine fermentation was filtered at harvest pH using a filter aid as required. The mycelial cake was washed with water and the cake was then discarded. The filtered beer and water wash (275 l.) was stirred for 45 minutes with 12.5 kg. of activated carbon and 2.5 kg. of diatomaceous earth. The mixture was filtered and the filtrate was discarded. The carbon cake was washed with 60 l. of water and the water wash was discarded. The cake was washed with 70 l. of 20% aqueous acetone and the 20% aqueous acetone was then discarded. The cake was then eluted twice with 100 l. portions of 90% aqueous acetone. The eluates were combined (215 l.) and the solution was concentrated (18 l.). This concentrate was adjusted to pH 10.0 with a 50% aqueous sodium hydroxide solution and extracted three times with 20 l. portions of methylene chloride. The methylene chloride extracts were combined (60 l.) and then concentrated to give an oily preparation (7.14 g.) containing lincomycin and lincomycin C in equal amounts and both in the free base form. This preparation was then dissolved in 200 ml. of methylene chloride. The solution was clarified by filtration and then concentrated to dryness in vacuo. The residue was dissolved in 100 ml. of 1 N methanolic hydrogen chloride. The methanolic solution was then mixed with 3.2 l. of ether under stirring. The resulting precipitated colorless, crude lincomycin hydrochloride and lincomycin C hydrochloride was isolated by filtration and dried; yield 7.14 g. assaying 940 mcg./mg. against *Sarcina lutea*. (The assay against *Sarcina lutea* is conducted on agar buffered to pH 6–8 with pH 7.0 phosphate buffer [0.1 M]. A unit volume [0.08 ml.] of solution containing the material to be assayed is placed on a 12.7 ml. assay disc which is then placed on an agar plate seeded with the assay microorganism.) Thin layer chromatography showed the presence of both lincomycin hydrochloride and lincomycin C hydrochloride in approximately equal amounts.

Crude lincomycin C hydrochloride (7.0 g.), as obtained in Preparation 1, was dissolved in 20 ml. of water and 20 ml. of butanol, pH adjusted to 4.2 with 1 N HCl, and the solution distributed in a counter current distribution apparatus for 1000 transfers. Analysis by thin layer chromatography showed that the fractions in tubes 135 to 190 contained lincomycin C. These fractions were combined, and the solution was concentrated and then freeze dried to give 2.44 g. of lincomycin C hydrochloride assaying 1400 mcg./mg. against *Sarcina lutea*. 500 mg. of this preparation was dissolved in 2 ml. of water, 1 ml. of methanol, and 100 ml. of acetone. The solution was clarified by filtration. The filtrate was mixed with ether until crystals appeared. The mixture was allowed to stand at room temperature for 1 hour. Crystalline (cubes) lincomycin C hydrochloride was separated from the supernatant material solution by decantation. These crystals were recrystallized from 1 ml. of water, 1 ml. of methanol, 80 ml. of acetone and 20 ml. of ether; yield, 250 mg. of crystalline (cubes) lincomycin C hydrochloride. The supernatant (obtained as described above) was allowed to stand at 5° C. for 4 hours. Crystalline (needles) lincomycin C hydrochloride which precipitated was filtered and dried; yield, 150 mg. of crystalline (needles) lincomycin C hydrochloride.

(B) *Chemical methods.*—In this method the starting compounds of Formula II are prepared as follows:

(1) Preparation of an amino sugar moiety from the fermentation products above;

(2) Synthesis of a 1,4-dialkylproline;

(3) Condensation of the amino sugar moiety with the dialkylproline to give an S-substituted N-(1,4-dialkylprolyl)-α-thiolincosaminide (IV) of the formula:

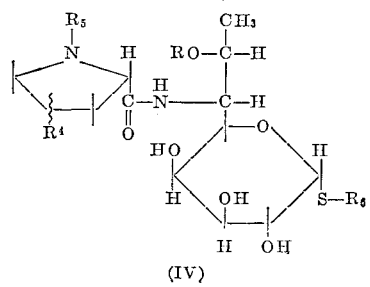

(IV)

wherein R, $R_4$ and $R_5$ have the significance as hereinbefore described and $R_6$ is selected from the group consisting of methyl, ethyl and 2-hydroxyethyl; and (4) Treatment of a compound of Formula IV with a mercaptan selected from the group of alkyl mercaptans wherein the alkyl group has from 1 to 18 carbon atoms, inclusive, benzyl mercaptan and 2-thenyl mercaptan, to obtain a mercaptal of Formula II.

The Preparations 2–31 illustrate the production of these products.

(1) The amino sugars:

PREPARATION 2

*Methyl α-thiolincosaminide*

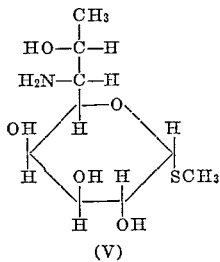

Methyl 6 - amino-6,8-dideoxy-1-thio-d-erythro-α-d-galacto-octopyranoside (Methyl α-thiolincosaminide) (V)

A solution of 40 g. of lincomycin (U.S. Patent 3,086,912) in 20 ml. of hydrazine hydrate (98–100%) was refluxed for 21 hours; excess hydrazine hydrate was then removed in vacuo under nitrogen at steam bath temperature, leaving a residue. The residue, a pasty mass of crystals, was cooled, acetonitrile was added, and the mixture was stirred until the crystals were suspended. The crystals were collected on a filter, washed with acetonitrile and with ether. The yield of white, crystalline methyl α-thiolincosaminide after drying in vacuo at room temperature was 21 g. (84%). Recrystallization was accomplished by dissolving methyl α-thiolincosaminide in hot dimethylformamide and adding an equal volume of ethylene glycol dimethyl ether.

Methyl α-thiolincosaminide has a melting point of 225–228° C., an optical rotation of $[\alpha]_D^{25}$ plus 276° (c.=.768, water) and a pKa' of 7.45.

*Analysis.*—Calcd. for $C_9H_{19}NO_5S$: C, 42.7; H, 7.56; N, 5.53; S, 12.66. Found: C, 42.6; H, 7.49; N, 5.75; S, 12.38.

PREPARATION 3

*Ethyl α-thiolincosaminide* (VI)

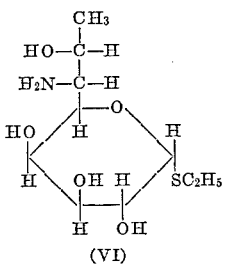

Lincomycin C hydrochloride (2 g.) was dissolved in 50 ml. of water. The pH of the solution was adjusted to 9.5 by the addition of an anion exchange resin in the hydroxide form. (An anion exchange resin obtained by chloromethylating by the procedure given on pages 88 and 97 of Kunin, Ion Exchange Resins, 2nd ed., [1958], John Wiley and Sons, Inc., polystyrene cross-linked, if desired, with divinylbenzene, prepared by the procedure given on page 84 of Kunin, supra, and quaternizing with trimethylamine or dimethylethanolamine, by the procedure given on page 97 of Kunin, supra.) The alkaline solution was then freeze dried to a residue which was dissolved in 50 ml. of hydrazine hydrate (98–100%) and refluxed for 24 hours. The solution was then concentrated to dryness in vacuo and the residue was stirred with three 10-ml. portions of acetonitrile. The insoluble material was collected and dried; yield 900 mg. A solution of 600 mg. of the dried insoluble material in 4 ml. of dimethylformamide (heat was used to promote solution) was then clarified by filtration and the filtrate was held at room temperature for 4 hours. The crystalline ethyl α-thiolincosaminide which precipitated was isolated by filtration, washed with ether and dried; yield 500 mg.

Ethyl α-thiolincosaminide has a melting point 191–195° C.; an optical rotation $[\alpha]_D^{25}$ plus 258° (c.=0.76, water); a pKa' of 7.17, and the following elemental analysis:

*Analysis.*—Calculated for $C_{10}H_{21}NO_5S$: C, 44.93; H, 7.92; N, 5.24; S, 11.99; O, 29.92. Found: C, 44.09; H, 7.91; N, 5.24; S, 11.32.

PREPARATION 4

*2-hydroxyethyl thiocelestosaminide*

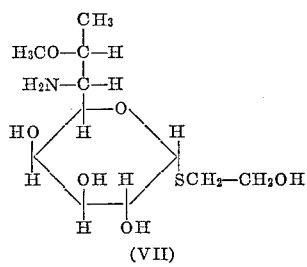

A mixture of 5 g. (0.0094 mole) of celesticetin (Example 3, U.S. Patent 2,928,844) and 25 ml. (excess) of hydrazine hydrate was heated under reflux for 21 hours. The excess hydrazine was removed by distillation in vacuo and the residue was crystallized from 35 ml. of absolute ethanol. White crystals (1.2 g.) of 2-hydroxyethyl thiocelestosaminide hydrazine solvate were obtained which melted at 98–108° C. Recrystallization from absolute ethanol gave 0.65 g. having an optical rotation of $[\alpha]_D^{25}$ plus 243° (c.=0.8, water); an infrared absorption spectrum in Nujol mull at the following frequencies: 3400, 1630, 1600, 1460, 1450 (sh.), 1305, 1275, 1260, 1200, 1115, 1085, 1055, 1010, 978, 950, 925, 910, 873, 800–820, 705, 690, and 680 cm$^{-1}$; an equivalent weight of 161 with two basic groups having pKa's in the region of 7.5; and the following elemental analysis:

*Analysis.*—Calculated for $C_{11}H_{23}NO_6S \cdot N_2H_4$: C, 40.11; H, 8.26; N, 12.76; S, 9.74. Found: C, 40.15; H, 8.04; N, 11.69; S, 9.56.

A solution of 2 g. of 2-hydroxyethyl thiocelestosaminide hydrazine solvate in 30 ml. of dimethylformamide was concentrated to a volume of about 10 ml. and then diluted with 10 ml. of dimethylformamide. Ether was added until cloudiness resulted, and 500 mg. of 2-hydroxyethyl thiocelestosaminide was deposited. The crystalline 2-hydroxyethyl thiocelestosaminide had an optical rotation of $[\alpha]_D^{25}$ plus 262° (c.=1, water); an infrared absorption spectrum at the following frequencies: 3400 (sh.), 3250, 1600, 1400, 1325, 1310, 1290, 1240, 1195, 1160, 1150 (sh.), 1110, 1100, 1075, 1045, 1038, 1005, 980, 920, 895, 825, 796, 740, 711, and 690 cm.$^{-1}$; an equivalent weight of 297; a pKa' of 7.2; and the following elemental analysis:

*Analysis.*—Calculated for $C_{11}H_{23}NO_6S$: C, 44.43; H, 7.80; N, 4.71; S, 10.78. Found: C, 44.20; H, 7.78; N, 4.97; S, 10.68.

(2) Synthesis of 1,4-dialkylprolines:

This synthesis can be carried out with known 4-ketoproline as starting material and schematically can be represented as follows:

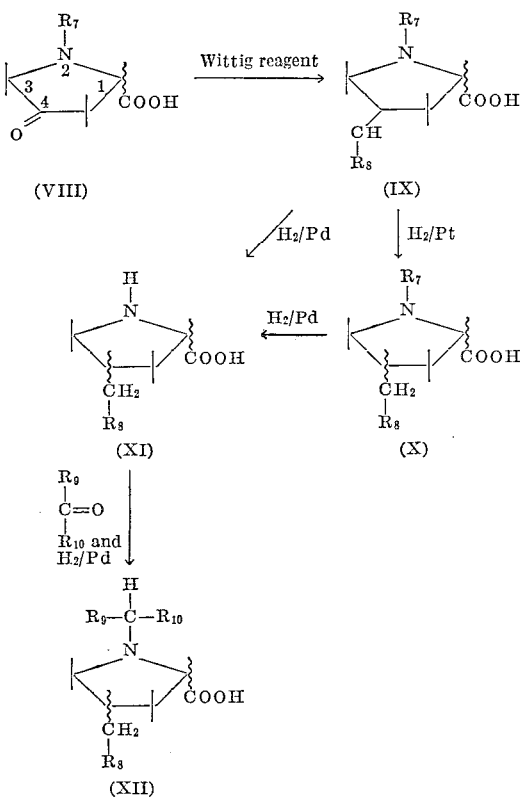

wherein $R_7$ is a protective hydrocarbyloxycarbonyl group which is removable by hydrogenolysis and wherein $R_8$ is selected from the group consisting of hydrogen and alkyl, in which the alkyl group contains from 1 to 11 carbon atoms, inclusive, and wherein $R_9$ and $R_{10}$ are selected from the group consisting of hydrogen and alkyl in which the groups contain together up to and including 12 carbon atoms.

The starting material may be an L- or D-proline and the 4-substituent which is introduced may be in the cis or trans position to the carboxyl group; the configurations at the 2- and 4-position are represented by wavy lines in the formulae.

The protective hydrocarbyloxycarbonyl groups, R, which are removable by hydrogenolysis, include particularly benzyloxycarbonyl groups of the formula:

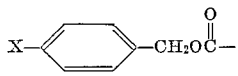

wherein X is selected from the group consisting of hydrogen, nitro, methoxy, chloro and bromo. Examples of such groups are benzyloxycarbonyl (carbobenzoxy), p-nitrobenzyloxycarbonyl, p-bromo- and p-chlorobenzyloxycarbonyl. They also include phenyloxycarbonyl groups of the formula:

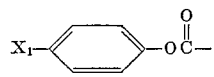

wherein $X_1$ is selected from the group consisting of hydrogen and alkyl containing from 1 to 4 carbon atoms, inclusive, such as phenyloxycarbonyl, p-tolyloxycarbonyl and p-ethylphenyloxycarbonyl; and allyloxycarbonyl and the like.

In addition, other substituents which are not hydrocarbyloxycarbonyl groups can be utilized as protective groups and removed by catalytic hydrogenolysis, e.g., triphenylmethyl, benzyl and p-nitrobenzyl.

This process comprises: treating a 1-hydrocarbyloxycarbonyl-4-ketoproline (VIII) with a Wittig reagent, usually an alkylidenetriphenylphosphorane [see, e.g., Wittig et al., Ber., 87, 1348 (1954); Trippett, Quarterly Reviews, XVII, No. 4, p. 406 (1963)] to obtain the corresponding 4 - alkylidene-1-hydrocarbyloxycarbonylproline (IX); hydrogenating the proline (IX) in the presence of a platinum catalyst to obtain the corresponding 4-alkyl-1-hydrocarbyloxycarbonylproline (X); hydrogenating compound X in the presence of a palladium catalyst to obtain the corresponding 4-alkylproline (XI); treating compound XI with a carbonyl compound $R_9COR_{10}$ defined as above, and hydrogenating in the presence of a palladium catalyst to obtain the corresponding 1,4-dialkylproline (XII).

Alternatively, the 4-alkylidene-1-hydrocarbyloxycarbonylproline (IX) can be hydrogenated in the presence of a palladium catalyst to give directly the 4-alkylproline of Formula XI.

Hydrogenation of compound IX in the presence of a platinum catalyst gives significant amounts of both cis and trans isomers of structure X. Hydrogenation of compound IX in the presence of palladium, however, gives final products which are mostly the cis isomers with mere traces of the trans isomers. In either method the final products can be obtained in pure form by conversion of the resulting 1,4-dialkylprolines (XII) to their amides, separating the amides chromatographically and hydrolyzing the separated amides to obtain the pure prolines.

PREPARATION 5

*4-methylene-1-carbobenzoxy-L-proline and dicyclohexylamine salt thereof*

Sodamide was prepared in the usual manner from 1.29 g. (56 mmole) of sodium in 170 ml. of liquid ammonia. 20 g. (56 mmole) of methyltriphenylphosphonium bromide was added, the mixture was stirred at room temperature (24–26° C.) for 1 hour, and the ammonia was evaporated. To the residue was added 150 ml. of a mixture of equal amounts of ether and tetrahdyrofuran. The mixture was heated at reflux for a period of 5–7 minutes, cooled to 26° C. and to it was added 2.63 g. (10 mmole) of 4-keto-1-carbobenzoxyl-L-proline [Patchett et al., J. Am. Chem. Soc., 79, 185 (1957)] in 20 ml. of tetrahydrofuran. After heating the reaction mixture under reflux for 2.5 hours, the mixture was cooled, diluted with ether and aqueous sodium bicarbonate solution and filtered; the ether was discarded. The filtrate was acidified, extracted with ether and the extracts were evaporated to give 2.2 g. of crude 4-methylene-1-carbobenzoxy-L-proline.

The crude material (2.2 g.) was dissolved in ether and 1.8 ml. of dicyclohexylamine was added; 3.25 g. (74.4% yield) of 4-methylene-1-carbobenzoxy-L-proline dicyclohexylamine salt crystallized rapidly. The crystals after drying melted at 154–158° C.; rotation $[\alpha]_D$ plus 0.56° (c., .795, chloroform).

PREPARATION 6

*Cis-4-methyl-L-proline*

A suspension of 20.9 g. of 4-methylene-1-carbobenzoxy-L-proline dicyclohexylamine salt in 308 ml. of 5% aqueous sodium hydroxide and 308 ml. of ether was shaken until all of the solid had dissolved. The layers were separated and each was back-washed with fresh solvent. The aqueous solutions were combined, acidified with dilute acid and extracted with ether. Evaporation of the solvent gave 4-methylene-1-carbobenzoxy-L-proline; yield, 12.1 g. (97.5%). This acid was dissolved in 250 ml. of methanol and hydrogenated over 2 g. of 10% palladium-on-carbon catalyst under 40 lbs. pressure of hydrogen for 2.5 hours. Filtration and evaporation of the reaction mixture gave cis-4-methyl-L-proline which was crystallized from methanol-ether; it melted at 231–233° C.

Further recrystallization from acetonitrile gave pure cis-4-methyl-L-proline melting at 238–240° C.

*Analysis.* — Calculated for $C_6H_{11}NO_2$: C, 55.79; H, 8.59; N, 10.85. Found: C, 55.39; H, 8.42; N, 10.78.

PREPARATION 7

*Cis-1,4-dimethyl-L-proline and the dicyclohexylamine salt thereof*

6 ml. of formalin and 1 g. of palladium-on-carbon catalyst (10% palladium) were added to the hydrogenated reaction mixture obtained in Preparation 6 and hydrogenation was continued for 2 hours. Thereafter the mixture was filtered to remove the catalyst and the solvent was removed by distillation. The resulting oily residue of 7.4 g., chiefly cis-1,4-dimethyl-L-proline, did not crystallize. It was dissolved in methanol and ether saturated with hydrogen chloride. Crystalline cis-1,4-dimethyl-L-proline hydrochloride precipitated; it was recovered by filtration and dried. The dried material had a melting point of 206 to 215° C. and after several recrystallizations from methanol and ether cis-1,4-dimethyl-L-proline hydrochloride of melting point 213–216° C. was obtained.

*Analysis.* — Calculated for $C_7H_{13}NO_2 \cdot HCl$: C, 46.80; H, 7.85; N, 7.80. Found: C, 47.54; H, 7.81; N, 8.00.

PREPARATION 8

*4-propylidene-1-carbobenzoxy-L-proline and dicyclohexylamine salt*

Sodium hydride (3.8 g.) was warmed with 75 ml. of dimethylsulfoxide at a temperature of 70–75° C. until the reaction was complete. After cooling to 20° C., 30.8 g. of propyltriphenylphosphonium bromide was added, and the resulting red solution was stirred for 30 minutes to insure complete reaction. A solution of 5.2 g. of 4-keto-1-carbobenzoxy-L-proline in 15 ml. of dimethyl sulfoxide was added over a period of 15 minutes, and the resulting mixture was stirred for 20 minutes at 26° C. and then at 70° C. for 4 hours. The reaction mixture was cooled, 100 ml. of 5% aqueous potassium bicarbonate and 100 ml. of water were added, and the mixture was filtered. The filtrate was washed twice with 150 ml. portions of ether and the ether was discarded after back extracting with bicarbonate. The bicarbonate solutions were combined, diluted with 200 ml. of water, and acidified with 4 N hydrochloric acid. The acidified mixture was extracted with three 200-ml. portions of ether. The combined ether extracts were washed with three 50-ml. portions of saturated aqueous sodium bisulfite, then with water and dried over anhydrous sodium sulfate. Evaporation of the solvent gave 5.7 g. of a solid residue which was 4-propylidene-1-carbobenzoxy-L-proline.

This residue was dissolved in 18 ml. of acetonitrile and treated with 2.8 ml. of dicyclohexylamine. The crystalline dicyclohexylamine salt, 5.2 g. (55% yield), melted at 154–157° C. After three recrystallizations from acetonitrile, an analytical sample was obtained which melted at 164–166° C. and had a rotation of $[\alpha]_D$ minus 8° (c.=0.3898, $CHCl_3$).

*Analysis.* — Calculated for $C_{28}H_{42}N_2O_4$: C, 71.45; H, 9.00; N, 5.95. Found: C, 71.77; H, 9.39; N, 5.1.

PREPARATION 9

*Cis-4-propyl-L-proline*

8 g. (17 mmoles) of the dicyclohexylamine salt of 4-propylidene-1-carbobenzoxy-L-proline was shaken with excess 1.5 N sodium hydroxide solution and ether until solution was complete. The layers were separated and each one was backwashed. The aqueous alkaline layer was combined with the backwash from the ether layer and acidified with 4 N hydrochloric acid. The mixture was extracted with ether and the ether extracts were combined and evaporated to give 4.8 g. (97.8%) of 4-propylidene-1-carbobenzoxy-L-proline as an oil. This oil was hydrogenated in 200 ml. of methanol over 1 g. of 10% palladium-on-charcoal catalyst for a period of 2 hours. Since the reaction appeared incomplete from thin layer chromatographic analysis, hydrogenation was continued for 2 hours after 0.5 g. of fresh catalyst had been added. The mixture was thereupon filtered and the filtrate was evaporated. The residue was crystallized from methanol-ether; melting point about 222° C. with decomposition. This product consisted of cis-4-propyl-L-proline with a trace of trans-4-propyl-L-proline.

PREPARATION 10

*Cis-4-propyl-1-methyl-L-proline*

To the hydrogenation mixture from a hydrogenation conducted as in Preparation 9 was added 5 ml. of formalin. The mixture was hydrogenated for 2.5 hours at 45 lbs. pressure of hydrogen in the presence of an additional ½ g. of 10% palladium-on-carbon catalyst. The mixture was cooled, filtered and the filtrate was evaporated to dryness. The residue was dissolved in methanol, converted to the hydrochloride by treatment of the methanol solution with ethereal hydrogen chloride solution and crystallized from methanol-ether to give 2.82 g. (80%) of cis-4-propyl-1-methyl-L-proline hydrochloride of melting point 201–206° C.; rotation $[\alpha]_D$ minus 60° (c.=0.8344, $H_2O$).

*Analysis.* — Calculated for $C_9H_{17}NO_2 \cdot HCl$: C, 52.04; H, 8.73; N, 6.75. Found: C, 51.72; H, 8.96; N, 6.44.

This sample contained less than 2% of trans-4-propyl-1-methyl-L-proline.

Treating cis-4-propyl-1-methyl-L-proline hydrochloride in aqueous solution with silver oxide, removing the thus-formed silver chloride and excess silver oxide by filtration, and evaporating the filtrate gave cis-4-propyl-1-methyl-L-proline in the zwitterion form.

PREPARATION 11

*1-ethyl-cis-4-propyl-L-proline*

In the manner given in Preparation 10, 5 ml. of acetaldehyde was added to a hydrogenation mixture from a hydrogenation as conducted in Preparation 9, and hydrogenation was continued in the presence of a palladium-on-charcoal catalyst to give 1-ethyl-cis-4-propyl-L-proline.

PREPARATION 12

*1-propyl-cis-4-propyl-L-proline*

In the manner given in Preparation 10, 5 ml. of propionaldehyde was added to a hydrogenation mixture from a hydrogenation as conducted in Preparation 9, and hydrogenation was continued in the presence of a palladium-on-charcoal catalyst to give 1-propyl-cis-4-propyl-L-proline.

PREPARATION 13

*1-butyl-cis-4-propyl-L-proline*

In the manner given in Preparation 10, 5 ml. of butyraldehyde was added to a hydrogenation mixture from a hydrogenation as conducted in Preparation 9, and hydrogenation was continued in the presence of a palladium-on-charcoal catalyst to give 1-butyl-cis-4-propyl-L-proline.

PREPARATION 14

*1-(1-pentylhexyl)-cis-4-propyl-L-proline*

In the manner given in Preparation 10, 5 ml. of dipentyl ketone was added to a hydrogenation mixture from a hydrogenation as conducted in Preparation 9, and hydrogenation was continued in the presence of a palladium-on-charcoal catalyst to give 1-(1-pentylhexyl)-cis-4-propyl-L-proline.

PREPARATION 15

*Cis-4-propyl-1-methyl-L-prolinamide and trans-4-propyl-1-methyl-L-prolinamide*

A mixture of 3.09 g. (15 mmoles) of cis-4-propyl-1-methyl-L-proline containing a small quantity of trans-4- propyl-1-methyl-L-proline, 9.5 ml. of tributylamine, 100 ml. of acetonitrile and 40 ml. of acetone was stirred until complete solution had taken place. To this solution, cooled to 10° C., was added 2.05 ml. of isobutyl chloroformate. The reaction mixture was stirred for 30 minutes in the ice bath after which time 15 ml. of ammonium hydroxide was added and stirring was continued for 2 hours at room temperature. The mixture was distilled in vacuo until a residue was obtained, which was acidified with hydrochloric acid and extracted with ether. The ether extracts were discarded. The acidified aqueous fraction was made alkaline with sodium hydroxide and extracted with methylene chloride. The methylene chloride extract was chromatographed over silica gel (500 g.) using aqueous 80% acetone as the eluant and taking 15 ml. fractions. The fractions consisting of almost pure cis-4-propyl - 1 - methyl-L-prolinamide as shown by thin layer chromatography and fractions of a mixture of cis-4-propyl - 1 - methyl-L-prolinamide together with trans-4-propyl-1-methyl-L-prolinamide were obtained. The latter fractions were rechromatographed to yield a small amount of fairly pure trans-4-propyl-1-methyl-L-prolinamide and a large amount of mixtures of trans-4-propyl-1-methyl-L-prolinamide and cis-4-propyl-1-methyl-L-prolinamide. The mixtures were again rechromatographed and the fractions containing almost pure trans-4-propyl-1-methyl-L-prolinamide were combined with the prior fraction containing the almost pure trans isomer. These fractions were thereupon recrystallized from Skellysolve B to give 10 mg. of trans-4-propyl-1-methyl-L-prolinamide, about 85% pure on the basis of thin layer chromatography; rotation $[\alpha]_D^{25}$ minus 91° (c., 0.833, $H_2O$).

The fractions containing the almost pure cis-4-propyl-1-methyl-L-prolinamide were recrystallized from ethyl acetate-Skellysolve B to give pure cis-4-propyl-1-methyl-L-prolinamide of melting point 113.5–115.5° C. and rotation $[\alpha]_D$ minus 89° (c., 0.841, $H_2O$).

*Analysis.*—Calcd. for $C_9H_{18}NO_2$: C, 63.49; H, 10.66; N, 16.46. Found: C, 63.41; H, 10.76; N, 16.28.

PREPARATION 16

*Cis-4-propyl-1-methyl-L-proline hydrochloride from cis-4-propyl-1-methyl-L-prolinamide*

Cis-4-propyl - 1 - methyl-L-prolinamide (400 mg.) was heated with 22 ml. of 20% hydrochloric acid under reflux for a period 4 hours. The reaction mixture was then cooled, evaporated to dryness in vacuo, and the residue was slurried with a small amount of warm ethanol and filtered to remove ammonium chloride. Ether was added to the filtrate and after cooling a white solid separated. After four recrystallizations from ethanol, cis-4-propyl-1-methyl - L - proline hydrochloride was obtained which, as in Preparation 10, could be converted to cis-4-propyl-1-methyl-L-prolyl by treatment with silver oxide.

PREPARATION 17

*Trans-4-propyl-1-methyl-L-proline hydrochloride*

In the manner given in Preparation 16, trans-4-propyl-1-methyl-L-prolinamide was hydrolyzed with hydrochloric acid to give trans-4-propyl-1-methyl-L-proline hydrochloride.

PREPARATION 18

*Cis-4-propyl-1-methyl-L-proline and trans-4-propyl-1-methyl-L-proline*

5 g. of 4-propylidene-1-carbobenzoxy-L-proline in 200 ml. of methanol was hydrogenated over 1 g. of a 7% platinum-on-Dowex 1 catalyst (40 lbs. $H_2$). (Dowex 1 is a strongly basic anion exchange resin produced by copolymerization of substituted styrenes and divinylbenzene.) After three hours of hydrogenation, 5 ml. of formalin and 1 g. of 10% palladium-on-charcoal catalyst was added and the hydrogenation was continued for 2½ hours at 45 lbs. pressure. The catalysts were then removed by filtration and the solvent was removed by distillation. The residue was dissolved in methanol, converted to the hydrochloride as in Preparation 10, and several times recrystallized from methanol-ether to give a mixture of the hydrochlorides of cis-4-propyl-1-methyl-L-proline and trans-4-propyl-1-methyl-4-proline, the latter in about 30% yield.

In the manner shown in Preparation 15, this mixture was separated by converting the 1-methylprolines into the amides and treating, as in Preparation 16, the mixture of amides to obtain pure cis-4-propyl-1-methyl-L-proline and pure trans-4-propyl-1-methyl-L-proline.

In the manner given in Preparation 18, other 1,4-dialkylprolines can be produced, such as trans-4-methyl-1-methyl-L-proline,
trans-4-ethyl-1-methyl-L-proline,
trans-4-butyl-1-methyl-L-proline,
trans-4-pentyl-1-methyl-L-proline,
trans-4-heptyl-1-methyl-L-proline,
trans-4-octyl-1-methyl-L-proline,
trans-4-decyl-1-methyl-L-proline,
trans-4-dodecyl-1-methyl-L-proline,
trans-4-butyl-1-octyl-L-proline,
trans-4-hexyl-1-dodecyl-L-proline,
trans-4-dodecyl-1-ethyl-L-proline,
trans-4-undecyl-1-(1-propylpentyl)-L-proline,
cis-4-butyl-1-ethyl-L-proline,
cis-4-butyl-1-propyl-L-proline,
cis-4-pentyl-1-propyl-L-proline,
cis-4-hexyl-1-butyl-L-proline,
cis-4-heptyl-1-pentyl-L-proline,
cis-4-decyl-1-(1-butylpentyl)-L-proline,
cis-4-dodecyl-1-(1-pentylheptyl)-L-proline, and the like.

The above methods are furthermore applicable for the preparation of the 1,4-dialkyl-D-prolines using as starting material 4-keto-D-proline and protecting the proline nitrogen by a protective hydrocarbyloxycarbonyl group as shown for the L-prolines in Formula VIII. Representative 1,4-dialkyl-D-prolines thus obtained include:

trans-4-propyl-1-methyl-D-proline,
trans-4-butyl-1-ethyl-D-proline,
cis-4-propyl-1-methyl-D-proline,
cis-4-hexyl-1-butyl-D-proline,
trans-4-dodecyl-1-decyl-D-proline,
cis-4-decyl-1-hexyl-D-proline, and the like.

(3) The condensation of the amino sugar with a 1,4-dialkylproline:

The condensation of the amino sugar with a selected 1,4-dialkylproline is generally carried out by reacting the 1,4-dialkylproline, dissolved in acetonitrile containing a trialkylamine, with isobutyl chloroformate and subsequently the amino sugar. The details of this reaction are illustrated by the following preparations.

PREPARATION 19

*Methyl N-(cis-4-hexyl-1-methyl-L-prolyl)-α-thiolincosaminide hydrochloride*

A mixture of 2.47 g. (12 mmoles) of cis-4-hexyl-1-methyl-L-prolyl hydrochloride and 7.6 ml. (16 mmoles) of tributylamine in 80 ml. of distilled acetonitrile was stirred until all of the solid had dissolved. The solution was cooled in an ice bath and 1.54 g. (12 mmoles) of isobutyl chloroformate was slowly added. After 1 hour a solution of 3 g. of methyl α-thiolincosaminide (12 mmoles) in 60 ml. of water was added. The reaction mixture was stirred for 1 hour in the ice bath and then 3 hours at 26° C. The acetonitrile was removed in vacuo and the residue thus obtained was diluted with 20 ml. of water and twice extracted with ether. The aqueous solution was lyophilized. The residue was dissolved in methanol, chloroform was added, and the solution was washed twice with water. The aqueous washings from above were lyophilized and dried at 50° C. under vacuum. The residue was leached several times with chloroform and the chloroform solution was chromatographed over 200 g. of Florisil, a synthetic magnesium silicate, collecting fractions of 375 ml. and using a gradient elution system composed of 3.2 l. of Skellysolve B hexanes and 0.8 l. of ethyl acetate in Reservoir A and a solution of 0.8 l. methanol and 2.56 l. with Skellysolve B hexanes-0.64 l. ethyl acetate in Reservoir B. The fractions which showed material in the lincomycin area by thin layer chromatography were combined and evaporated to give a residue. This residue was dissolved in dilute hydrochloric acid. Adding acetone to the solution precipitate crude methyl N-(cis-4-hexyl-1-methyl-L-prolyl)-α-thiolincosaminide hydrochloride, having the following formula:

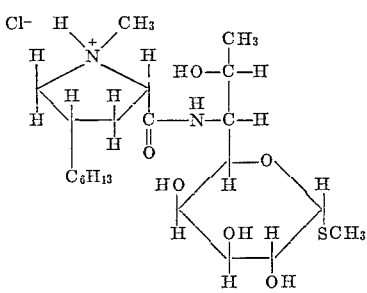

2 g. of methyl N-(cis-4-hexyl-1-methyl-L-prolyl)-α-thiolincosaminide hydrochloride, dissolved in 100 ml. of water, was treated with 2 g. of silver carbonate. The mixture was then extracted three times with butanol. The combined extracts were distilled in vacuo to give a residue which was dissolved in ethanol. The solution was treated with 1 g. of activated charcoal and filtered. The filtrate was evaporated to dryness and the residue was crystallized and twice recrystallized from ethanol to give methyl N-(cis-4-hexyl-1-methyl-L-prolyl)-α-thiolincosaminide.

PREPARATION 20

*Methyl N-(trans-4-butyl-1-methyl-L-prolyl)-α-thiolincosaminide and hydrochloride thereof*

To a solution of 6.3 g. of trans-4-butyl-1-methyl-L-proline in 175 ml. of distilled acetonitrile cooled to 0° there was added 3.46 ml. of triethylamine followed by 3.34 ml. of isobutylchloroformate. The mixture was stirred at 0° C. (±3°) for 15 min. A solution of 6.2 g. of methyl α-thiolincosaminide in 85 ml. of water was added, and the reaction mixture was stirred at 0° C. for 0.5 hour and at 25° C. for 1 hour. The reaction product was then filtered and dried, yielding methyl N-(trans-4-butyl-1-methyl-L-prolyl)-α-thiolincosaminide. The thus-obtained product was treated with sufficient dilute hydrochloric acid to dissolve it, and the thus-obtained hydrochloride was precipitated by the addition of acetone. Repeating this procedure gave pure methyl N-(trans-4-butyl-1-methyl-L-prolyl)-α-thiolincosaminide hydrochloride melting at 139–141° C.

In the manner given in Preparation 20, the corresponding cis-epimer, methyl N-(cis-4-butyl-1-methyl-L-prolyl)-α-thiolincosaminide hydrochloride was prepared in a crystalline, solvated (4.95% water) form having a softening point of 108° C. and melting at about 189° C.

In the manner given in Preparation 19, other alkyl N-(1,4-dialkylprolyl)-α-thiolincosaminides and 2-hydroxyethyl N-1,4-dialkylprolyl)-α-thiocelestosaminides are prepared by reacting selected 1,4-dialkylprolines dissolved in acetonitrile containing triethylamine with isobutyl chloroformate and then with methyl or ethyl α-thiolincosaminide or 2-(hydroxyethyl) 7-methoxy-α-thiolincosaminide (2-hydroxyethyl α - thiocelestosaminide). Representative compounds thus obtained include:

methyl N-(trans-4-methyl-1-methyl-L-prolyl)-α-thiolincosaminide,
methyl N-(trans-4-ethyl-1-methyl-L-prolyl)-α-thiolincosaminide,
methyl N-(trans-4-propyl-1-butyl-L-prolyl)-α-thiolincosaminide,
methyl N-(trans-4-octyl-1-ethyl-L-prolyl)-α-thiolincosaminide,
methyl N-(trans-4-decyl-1-butyl-L-prolyl)-α-thiolincosaminide,
methyl N-(trans-4-undecyl-1-hexyl-L-prolyl)-α-thiolincosaminide,
methyl N-(trans-4-dodecyl-1-isopropyl-L-prolyl)-α-thiolincosaminide,
methyl N-(cis-4-methyl-1-octyl-L-prolyl)-α-thiolincosaminide,
methyl N-(cis-4-propyl-1-ethyl-L-prolyl)-α-thiolincosaminide,
methyl N-(cis-4-hexyl-1-dodecyl-L-prolyl)-α-thiolincosaminide,
methyl N-(cis-4-pentyl-1-nonyl-L-prolyl)-α thiolincosaminide,
methyl N-(cis-4-ethyl-1-undecyl-L-prolyl)-α-thiolincosaminide,
methyl N-(trans-4-pentyl-1-decyl-D-prolyl)-α-thiolincosaminide,
methyl N-(trans-4-propyl-1-methyl-D-prolyl)-α-thiolincosaminide,
methyl N-(trans-4-ethyl-1-propyl-D-prolyl)-α-thiolincosaminide,
methyl N-(trans-4-hexyl-1-dodecyl-D-prolyl)-α-thiolincosaminide,
methyl N-(cis-4-methyl-1-octyl-D-prolyl)-α-thiolincosaminide,
methyl N-(cis-4-octyl-1-methyl-D-prolyl)-α-thiolincosaminide,
methyl N-(cis-4-decyl-1-ethyl-D-prolyl)-α-thiolincosaminide,
ethyl N-(trans-4-ethyl-1-methyl-L-prolyl)-α-thiolincosaminide,
ethyl N-(trans-4-propyl-1-methyl-L-prolyl)-α-thiolincosaminide,
ethyl N-(trans-4-butyl-1-ethyl-L-prolyl)-α-thiolincosaminide,
ethyl N-(trans-4-hexyl-1-octyl-L-prolyl)-α-thiolincosaminide,
ethyl N-(trans-4-dodecyl-1-methyl-L-prolyl)-α-thiolincosaminide,
ethyl N-(cis-4-methyl-1-methyl-L-prolyl)-α-thiolincosaminide,
ethyl N-(cis-4-propyl-1-ethyl-L-prolyl)-α-thiolincosaminide,
ethyl N-(cis-4-butyl-1-methyl-L-prolyl)-α-thiolincosaminide,
ethyl N-(cis-4-pentyl-1-ethyl-L-prolyl)-α-thiolincosaminide,
ethyl N-(cis-4-hexyl-1-propyl-L-prolyl)-α-thiolincosaminide,
ethyl N-(cis-4-heptyl-1-propyl-L-prolyl)-α-thiolincosaminide,
ethyl N-(cis-4-octyl-1-propyl-L-prolyl)-α-thiolincosaminide,
ethyl N-(cis-4-dodecyl-1-hexyl-L-prolyl)-α-thiolincosaminide,
ethyl N-(cis-4-dodecyl-1-methyl-D-prolyl)-α-thiolincosaminide,
ethyl N-(cis-4-methyl-1-decyl-D-prolyl)-α-thiolincosaminide,
ethyl N-(cis-4-propyl-1-octyl-D-prolyl)-α-thiolincosaminide, ethyl N-(cis-4-octyl-1-propyl-D-prolyl)-α-
thiolincosaminide,
ethyl N-(cis-4-butyl-1-hexyl-D-prolyl)-α-
thiolincosaminide,
ethyl N-(cis-4-nonyl-1-heptyl-D-prolyl)-α-
thiolincosaminide,
ethyl N-(trans-4-methyl-1-ethyl-D-prolyl)-α-
thiolincosaminide,
ethyl N-(trans-4-ethyl-1-methyl-D-prolyl)-α-
thiolincosaminide,
ethyl N-(trans-4-propyl-1-decyl-D-prolyl)-α-
thiolincosaminide,
ethyl N-(trans-4-butyl-1-nonyl-D-prolyl)-α-
thiolincosaminide,
ethyl N-(trans-4-hexyl-1-octyl-D-prolyl)-α-
thiolincosaminide,
ethyl N-(trans-4-decyl-1-dodecyl-D-prolyl)-α-
thiolincosaminide,
ethyl N-(trans-4-dodecyl-1-undecyl-D-prolyl)-α-
thiolincosaminide,
2-hydroxyethyl N-(trans-4-propyl-1-ethyl-L-prolyl)-α-
thiocelestosaminide,
2-hydroxyethyl N-(trans-4-butyl-1-ethyl-L-prolyl)-α-
thiocelestosaminide,
2-hydroxyethyl N-(trans-4-pentyl-1-methyl-L-prolyl)-α-
thiocelestosaminide,
2-hydroxyethyl N-(trans-4-hexyl-1-propyl-L-prolyl)-α-
thiocelestosaminide,
2-hydroxyethyl N-(trans-4-octyl-1-decyl-L-prolyl)-α-
thiocelestosaminide,
2-hydroxyethyl N-(trans-4-decyl-1-methyl-L-prolyl)-α-
thiocelestosaminide,
2-hydroxyethyl N-(trans-4-dodecyl-1-ethyl-L-prolyl)-α-
thiocelestosaminide,
2-hydroxyethyl N-(cis-4-methyl-1-ethyl-L-prolyl)-α-
thiocelestosaminide,
2-hydroxyethyl N-(cis-4-ethyl-1-methyl-L-prolyl)-α-
thiocelestosaminide,
2-hydroxyethyl N-(cis-4-propyl-1-methyl-L-prolyl)-α-
thiocelestosaminide,
2-hydroxyethyl N-(cis-4-butyl-1-methyl-L-prolyl)-α5
thiocelestosaminide,
2-hydroxyethyl N-(cis-4-hexyl-1-dodecyl-L-prolyl)-α-
thiocelestosaminide,
2-hydroxyethyl N-(cis-4-octyl-1-butyl-L-prolyl)-α-
thiocelestosaminide,
2-hydroxyethyl N-(trans-4-propyl-1-ethyl-D-prolyl)-α-
thiocelestosaminide,
2-hydroxyethyl N-(trans-4-propyl-1-methyl-D-prolyl)-α-
thiocelestosaminide,
2-hydroxyethyl N-(trans-4-hexyl-1-octyl-D-prolyl)-α-
thiocelestosaminide,
2-hydroxyethyl N-(trans-4-heptyl-1-hexyl-D-prolyl)-α-
thiocelestosaminide,
2-hydroxyethyl N-(trans-4-decyl-1-nonyl-D-prolyl)-α-
thiocelestosaminide,
2-hydroxyethyl N-(trans-4-undecyl-1-propyl-D-prolyl)-α-
thiocelestosaminide,
2-hydroxyethyl N-(trans-4-dodecyl-1-ethyl-D-prolyl)-α-
thiocelestosaminide,
2-hydroxyethyl N-(cis-4-propyl-1-methyl-D-prolyl)-α-
thiocelestosaminide,
2-hydroxyethyl N-(cis-4-butyl-1-methyl-D-prolyl)-α-
thiocelestosaminide,
2-hydroxyethyl N-(cis-4-pentyl-1-ethyl-D-prolyl)-α-
thiocelestosaminide,
2-hydroxyethyl N-(cis-4-hexyl-1-undecyl-D-prolyl)-α-
thiocelestosaminide,
2-hydroxyethyl N-(cis-4-heptyl-1-dodecyl-D-prolyl)-α-
thiocelestosaminide,
2-hydroxyethyl N-(cis-4-decyl-1-methyl-D-prolyl)-α-
thiocelestosaminide,
2-hydroxyethyl N-cis-4-dodecyl-1-ethyl-D-prolyl)-α-
thiocelestosaminide, and the like.

PREPARATION 21

*N-(trans-4-propyl-1-methyl-L-prolyl)lincosamine
dimethyl mercaptal*

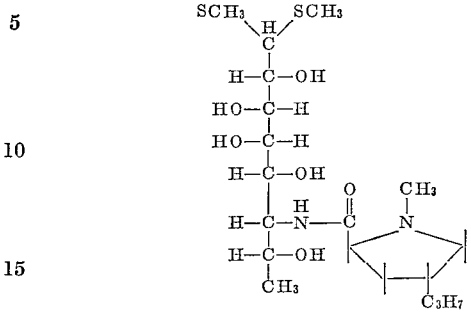

In a 1 liter, 3-necked flask equipped with a Dry Ice condenser, 150 ml. of concentrated hydrochloric acid and 80 ml. of methanethiol were chilled to 0° C. After rapid addition of 15 g. of lincomycin C hydrochloride (Preparation 1), the mixture was rapidly stirred for 5 hours, diluted with 1 volume of ice water and extracted with two 100-ml. portions of pentane. The extract was discarded. The hydrochloric acid solution was partially neutralized by addition of 100 g. of potassium hydroxide pellets at about 25° C. (Dry Ice-acetone cooling permitted rapid addition.) The potassium chloride was removed by filtration. Chloroform (200 ml.) was added to the filtrate, which was then adjusted to pH 10 by the addition of 2 N aqueous sodium hydroxide solution and extracted with the chloroform. After a second extraction with chloroform, the chloroform extracts were combined and washed with three 50-ml. portions of water, a procedure which resulted in an emulsion. The extracts containing water were evaporated in vacuo, thus transferring the desired product to the aqueous phase which was then freeze dried. The freeze-dried product was crystallized from 75 ml. of boiling acetone to give 7.5 g. of product melting at 134–140° C. After a second crystallization from acetone, N-(trans-4-propyl-1-methyl-L-prolyl)lincosamine dimethyl mercaptal was obtained; M.P. 146–148° C., optical rotation $[\alpha]_D^{25}$ =minus 33° (c=1,methylene chloride).

*Analysis.*—Calculated for $C_{19}H_{38}N_2O_6S_2$: C, 50.19; H, 8.42; N, 6.16; O, 21.12; S, 14.10. Found: C, 50.15; H, 8.20; N, 6.16; S, 14.31.

PREPARATION 22

*N-(trans-4-propyl-1-methyl-L-prolyl)lincosamine
diethyl mercaptal*

In a 1 liter, 3-necked flask were placed concentrated hydrochloric acid (150 ml.) and 50 ml. of ethanethiol, previously cooled to 0° C. To this mixture was added 15 g. of lincomycin hydrochloride. After stirring magnetically at room temperature for a period of 5 hours, the reaction mixture was diluted with an equal volume of ice water, and the solution was extracted three times with Skellysolve B hexanes. The Skellysolve B hexane extracts were discarded.

The majority of the acid was then neutralized by the careful addition of solid potassium hydroxide (about 100 g.) while keeping the temperature of the well-stirred reaction mixture between 20 and 30° by cooling in an acetone-Dry Ice mixture. The thus-formed solid potassium chloride was removed by filtration and the solid was washed well with chloroform. The chloroform washings and additional chloroform were added to the filtrate (a total of about 150 ml.) and the mixture while stirred magnetically was adjusted to a pH of 10 by the addition of 2 N aqueous sodium hydroxide. The chloroform layer was separated and the aqueous layer extracted thoroughly with chloroform. The chloroform extracts were combined, washed twice with water, and dried over anhydrous sodium sulfate. The dried solution was evaporated at 30° in vacuo to give a semisolid residue which was recrystallized three times from acetone to give colorless, flattened needles of melting point 130–132°. A total yield of 6.91 g., 42.4%, of N-(trans-4-propyl-1-methyl - L - prolyl)lincosamine diethyl mercaptal was obtained.

*Analysis.*—Calcd. for $C_{21}H_{42}N_2O_6S_2$: C, 52.25; H, 8.77; N, 5.81; S, 13.29%. Found: C, 52.38; H, 8.71; N, 5.93; S, 13.46%.

PREPARATION 23

*N-(trans-4-propyl-1-methyl-L - prolyl)lincosamine dibutyl mercaptal and a mixture of N-(trans-4-propyl-1-methyl-L-prolyl)lincosamine butyl methyl mercaptals*

To a slurried mixture of 167 ml. of concentrated hydrochloric acid and 100 g. of butanethio (1.1 moles) at 0° C. was added 17 g. (0.0384 mole) of lincomycin hydrochloride. After stirring vigorously for 5 hours at 10°, 160 ml. of ice water was added and the reaction mixture was extracted three times with 200 ml. portions of Skellysolve B hexanes. The Skellysolve B hexane fractions were discarded. The aqueous phase was cooled and potassium hydroxide pellets were added while keeping the temperature at 10–20°. The thus-obtained potassium chloride was removed by filtration. The filter cake of potassium chloride was washed twice, each time with 200 ml. of chloroform, and the chloroform washings were added to the filtrate. The reaction mixture was adjusted to pH 10 by adding sufficient 2 N sodium hydroxide solution, about 110 ml. The chloroform layer was separated and the water layer extracted twice with 200 ml. of chloroform. The chloroform layer and extracts were combined, washed 3 times with 100 ml. portions of saturated sodium chloride solution. The chloroform phase was then filtered and evaporated in vacuo to give 11.5 g. of white solid. This was dissolved at room temperature in a mixture of methanol (1 part) and chloroform (9 parts) by volume. The solution was chromatographed over 800 g. of silica gel, taking fractions of 50 ml. each. The first 800 ml. of a forerun was discarded and on the basis of thin layer chromatography data the following fractions were combined:

Fractions 14–16, inclusive, (A); Fractions 19–23, inclusive, (B); Fractions 30–41, inclusive, (C). Each of these fractions upon evaporation of the solvent produced crystallized material as follows:

Fraction A was recrystallized from acetone to give pure N-(trans-4-propyl-1-methyl-L-prolyl)lincosamine dibutyl mercaptal having a melting point of 110–112° C., a rotation $[\alpha]_D^{24}$ minus 11° (c., 0.5654, chloroform) and the following analysis:

*Analysis.*—Calculated for $C_{25}H_{50}N_2O_6S_2$: C, 55.73; H, 9.35; N, 5.20; S, 11.90. Found: C, 55.65; H, 9.78; N, 5.42; S, 12.06.

Fraction B was recrystallized from acetone to give the mixed mercaptal, N-(trans-4-propyl-1-methyl-L-prolyl) lincosamine methyl butyl mercaptal, as a mixture of the two diastereoisomers, melting point 120–130°; $[\alpha]_D$ minus 18° (c., 0.9046, chloroform).

*Analysis.*—Calculated for $C_{22}H_{44}N_2O_6S_2$: C, 53.19; H, 8.93; N, 5.64; S, 12.91. Found: C, 52.67; H, 8.01; N, 5.90; S, 12.87.

Fraction C consisted of the dimethyl mercaptal, namely, N-(trans-4-propyl-1-methyl-L-prolyl)lincosamine dimethyl mercaptal, identical with the material obtained in Preparation 21.

PREPARATION 24

*N-(trans-4-ethyl-1-methyl-L-prolyl)lincosamine dioctadecyl mercaptal*

In the manner given in Preparation 21, methyl N-(trans-4-ethyl-1-methyl-L-prolyl)-α-thiolincosaminide was reacted with octadecanethiol and concentrated hydrochloric acid to give N-(trans-4-ethyl-1-methyl-L-prolyl)lincosamine dioctadecyl mercaptal.

PREPARATION 25

*N-(trans-4-octyl-1-ethyl-L-prolyl)lincosamine didodecyl mercaptal*

In the manner given in Preparation 21, reacting methyl N - (trans-4-octyl-1-ethyl-L-prolyl)-α-thiolincosaminide with dodecanethiol and concentrated hydrochloric acid produces N-(trans-4-octyl-1-ethyl-L-prolyl)lincosamine didodecyl mercaptal.

PREPARATION 26

*N-(cis-4-methyl-1-octyl-D-prolyl)lincosamine ditetradecyl mercaptal*

In the manner given in Preparation 21, reacting methyl N - (cis-4-methyl-1-octyl-D-prolyl)-α-thiolincosaminide with tetradecanethiol and concentrated hydrochloric acid produces N-(cis-4-methyl-1-octyl-D-prolyl)lincosamine ditetradecyl mercaptal.

PREPARATION 27

*N-(trans-4-propyl-1-methyl-L-prolyl)lincosamine dihexyl mercaptal*

In the manner given in Preparation 21, reacting ethyl (trans - 4 - propyl-1-methyl-L-prolyl)-α-thiolincosaminide with hexanethiol and concentrated hydrochloric acid produces N - (trans-4-propyl-1-methyl-L-prolyl)lincosaminie dihexyl mercaptal.

PREPARATION 28

*N-(trans-4-propyl-1-methyl-L-prolyl)celestosamine diundecyl mercaptal*

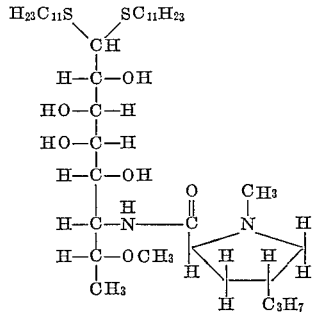

In the manner given in Preparation 21, reacting 2-hydroxyethyl N - (trans-4-propyl-1-methyl-L-prolyl)-α-thiocelestosaminide with undecanethiol and concentrated hydrochloric acid produces N-(trans-4-propyl-1-methyl-L-prolyl)celestosamine diundecyl mercaptal.

PREPARATION 29

*N-(cis-4-butyl-1-ethyl-D-prolyl)celestosaminie dihexyl mercaptal*

In the manner given in Preparation 21, reacting 2-hydroxyethyl N - (cis-4-butyl-1-ethyl-D-prolyl)-α-thiocelestosaminide with hexanethiol and concentrated hydrochloric acid produces N-(cis-4-butyl-1-ethyl-D-prolyl)celestosamine dihexyl mercaptal.

PREPARATION 30

*N-(cis-4-hexyl-1-ethyl-L-prolyl)lincosamine dibenzyl mercaptal and a mixture of two isomeric N-(cis-4-hexyl-1-ethyl-L-prolyl)lincosamine benzyl methyl mercaptals*

In the manner given in Preparation 23, benzyl mercaptan, hydrochloric acid and methyl N-(cis-4-hexyl-1-ethyl-L-prolyl)-α-thiolincosaminide were reacted to give a mixture of products which was separated by chromatography into:

(A) N - (cis-4-hexyl-1-ethyl-L-prolyl)lincosamine dibenzyl mercaptal;
(B) A mixture of two N-(cis-4-hexyl-1-ethyl-L-prolyl) lincosamine benzyl methyl mercaptals;
(C) A small fraction of N-(cis-4-hexyl-1-ethyl-L-prolyl)lincosamine dimethyl mercaptal.

PREPARATION 31

*N - (cis-4-propyl-1-methyl-D-prolyl)lincosamine di-2-thenyl mercaptal and a mixture of two isomeric N-(cis-4-propyl-1-methyl-D-prolyl)lincosamine 2-thienyl ethyl mercaptals*

In the manner given in Preparation 23, 2-thenyl mercaptan, hydrochloric acid and ethyl N-(cis-4-propyl-1-methyl-D-prolyl)-α-thiolincosaminide were reacted to give a mixture of products which was separated by chromatography into:

(A) N - (cis-4-propyl-1-methyl-D-prolyl)lincosamine di-2-thenyl mercaptal;

(B) A mixture of two N-(cis-4-propyl-1-methyl-D-prolyl)lincosamine 2-thenyl ethyl mercaptals;

(C) A small fraction of N-(cis-4-propyl-1-methyl-D-prolyl)lincosamine diethyl mercaptal.

In the manner given in Preparation 21, other N-(1,4-dialkylprolyl)lincosamine mercaptals and N-(1,4-dialkylprolyl)celestosamine mercaptals can be prepared by reacting a selected methyl or ethyl N-(1,4-dialylprolyl)-α-thiolincosaminide or a 2-hydroxyethyl N-(1,4-dialkylprolyl)-α-thiocelestosaminide with an alkyl (1 to 18 carbon atoms), benzyl or 2-thenyl mercaptan in the presence of hydrochloric acid. Representative compounds thus obtained include:

N-(trans-4-propyl-1-methyl-L-prolyl)lincosamine dihexyl mercaptal,
N-(trans-4-ethyl-1-methyl-L-prolyl)lincosamine dioctadecyl mercaptal,
N-(trans-4-decyl-1-butyl-L-prolyl)lincosamine dioctyl mercaptal,
N-(cis-4-propyl-1-ethyl-L-prolyl)lincosamine diheptyl mercaptal,
N-(trans-4-pentyl-1-decyl-D-prolyl)lincosamine didecyl mercaptal,
N-(trans-4-butyl-1-methyl-L-prolyl)lincosamine dibenzyl mercaptal,
N-(trans-4-propyl-1-methyl-L-prolyl)lincosamine di-2-thenyl mercaptal,
N-(trans-4-octyl-1-ethyl-L-prolyl)lincosamine didodecyl mercaptal,
N-(cis-4-hexyl-1-dodecyl-L-prolyl)lincosamine dibutyl mercaptal,
N-(cis-4-butyl-1-ethyl-L-prolyl)celestosamine dibutyl mercaptal,
N-(trans-4-heptyl-1-dodecyl-D-prolyl)celestosamine dioctyl mercaptal,
N-(trans-4-octyl-1-methyl-D-prolyl)celestosamine di-2-thenyl mercaptal,
N-(cis-4-hexyl-1-butyl-D-prolyl)celestosamine dibenzyl mercaptal,
and the like.

In the manner given in Preparation 23, other N-(1,4-dialkylprolyl)lincosamine dialkyl mercaptals of Formula II can be prepared by reacting a selected methyl or ethyl N - (1,4-dialkylprolyl)-α-thiolincosaminide or 2-hydroxyethyl N-(1,4-dialkylprolyl)-α-thiocelestosaminide with an alkyl (1 to 18 carbon atoms), benzyl or 2-thenyl mercaptan. Those dialkyl mercaptals of Formula II in which $R_1$ and $R_2$ are different have an additional asymmetric carbon atom and exist as a mixture of two diastereoisomers.

Representative compounds (in such isomer mixture) obtained as shown above include:

N-(trans-4-propyl-1-methyl-L-prolyl)linecosamine methyl hexyl mercaptal,
N-(trans-4-ethyl-1-methyl-L-prolyl)lincosamine methyl octadecyl mercaptal,
N-(trans-4-decyl-1-butyl-L-prolyl)lincosamine methyl octyl mercaptal,
N-(cis-4-propyl-1-ethyl-L-prolyl)lincosamine methyl heptyl mercaptal,
N-(trans-4-pentyl-1-decyl-D-prolyl)lincosamine methyl decyl mercaptal,
N-(trans-4-butyl-1-methyl-L-prolyl)lincosamine methyl benzyl mercaptal,
N-(trans-4-propyl-1-methyl-L-prolyl)lincosamine methyl 2-thenyl mercaptal,
N-(trans-4-octyl-1-ethyl-L-prolyl)lincosamine methyl dodecyl mercaptal,
N-(cis-4-hexyl-1-dodecyl-L-prolyl)lincosamine methyl butyl mercaptal,
N-(cis-4-butyl-1-ethyl-L-prolyl)celestosamine methyl butyl mercaptal,
N-(trans-4-heptyl-1-dodecyl-D-prolyl)celestosamine methyl octyl mercaptal,
N-(trans-4-octyl-1-methyl-D-prolyl)celestosamine methyl 2-thenyl mercaptal,
N-(cis-4-hexyl-1-butyl-D-prolyl)celestosamine methyl benzyl mercaptal, and the like.

In carrying out the process of the present invention, the starting mercaptal of Formula II can be cyclized either by heating alone or by heating in the presence of an acid.

In the first method, a starting compound of Formula II is merely heated above its melting point until the evolution of a mercaptan as a gas is noted. When the cyclization reaction has ceased, the melt can be extracted and the product recovered by conventional methods such as recrystallization, chromatography, solvent distribution, and the like, particularly after converting the product to an acid salt such as the hydrochloride. The time required for this reaction is very short after the compound has been heated to the temperature of the mercaptan evolution. Usually between one half minute and ten minutes is sufficient. Depending on the melting point, temperatures between 200 and 350° are necessary to effect the cyclization.

In the method in which an acid is employed to produce cyclization of the mercaptal, a solvent is used in which both the starting material and the acid must be soluble. Depending on the acid used, acetonitrile, tetrahydrofuran, dioxane, benzene, toluene, ethylbenzene, carbon tetrachloride, ethylene dichloride, and the like can be used, with acetonitrile preferred. Acids useful in this reaction are the benzenesulfonic acids, such as benzenesulfonic acid, p-toluenesulfonic acid, p-ethylbenzene-sulfonic acid, p-propylbenzenesulfonic acid, p-isopropylsulfonic acid, p-tertiary-butylbenzenesulfonic acid, m- and p-chlorobenzenesulfonic acids, m- and p-bromobenzenesulfonic acids, and the like. Other acids such as the alkylsulfonic acids, for example, methanesulfonic acid, ethanesulfonic acid, propanesulfonic acid, butanesulfonic acid, and the like, as well as essentially anhydrous mineral acids, such as hydrogen fluoride, hydrogen chloride, hydrogen bromide, concentrated sulfuric acid, and the like can also be used. The preferred acids are the benzenesulfonic acids, particularly p-toluenesulfonic acid. The amount of acid necessary for this reaction is equimolar or slightly more with respect to the starting mercaptal. In the presence of less than equimolar amounts of acid, the process will be operative, but the yields are decreased. In the preferred embodiment of this invention, the temperature at which this reaction is performed is the reflux temperature of the reaction mixture. After the reaction is terminated (¼ to 4 hours) the product is recovered in conventional manner, particularly by chromatographic methods and extraction methods which make use of the high degree of water-solubility of the hydrochloride of the final product.

The following examples are illustrative of the process and products of the present invention, but are not to be construed as limiting.

EXAMPLE 1

*Lincomycin (I) from N-(trans-4-propyl-1-methyl-L-prolyl)lincosamine dimethyl mercaptal*

A solution of 1 g. of N-(trans-4-propyl-1-methyl-L-prolyl)lincosamine dimethyl mercaptal (as obtained in Preparation 21 from lincomycin C) and 0.5 g. of p-toluenesulfonic acid monohydrate in 20 ml. of acetonitrile was heated under reflux. After 10 minutes another portion of 0.5 g. of p-toluenesulfonic acid monohydrate was added and the reaction was continued for another 20 minutes. The reaction mixture was then cooled and evaporated to dryness under vacuo. The residue was dissolved in methylene chloride containing 1 ml. of triethylamine, and again the solvent was distilled. The newly-obtained residue was dissolved in methylene chloride and 4 g. of silica gel (silica gel 0.05–0.20 millimeter for chromatography, E. Merck AG, Darmstadt, Germany) was added. The solvent was evaporated in vacuo and the remaining dry powder was sifted onto a column of 100 g. of silica gel packed in a 19 mm. wide glass tube. The column was then eluted with 5 ml. portions of a solvent mixture consisting of ethyl acetate, acetone and water in the ratio of 8:5:1. Fractions 102 through 131 contained lincomycin. The largest amount (147 mg.) of lincomycin was found in Fractions 105 to 125. This amount (147 mg.) was dissolved in acetone, acidified with a few drops of dilute hydrochloric acid and scratched. Crystals formed which were collected after refrigeration for 18 hours. In this manner 110 mg. of lincomycin hydrochloride was obtained which was recrystallized by dissolving in water and adding acetone. The thus-obtained lincomycin hydrochloride had a melting point of 149–153° and compared with authentic lincomycin hydrochloride in melting point, infra-red absorption and standard biological assay using *Sarcina lutea* as the test organism.

The progress of the cyclization was followed by thin layer chromatography. Every 10 minutes 2 drops of the reaction mixture was withdrawn and diluted with 1 ml. of acetone containing 1 drop of triethylamine. From this solution one lambda was spotted on a thin layer chromatography plate (2" x 8") coated with silica gel. The plate was developed with a solution of ethyl acetate, acetone and water in the proportions of 8:5:1. The spots were detected by spraying the dried plate with a KMnO₄-NaIO₄ reagent.

Another method for testing for lincomycin was to press an identical plate as used for the thin layer chromatography on an agar coated tray which was inoculated with the test organism *Sarcina lutea*. After 20 hours of incubation at 30° C., a clear zone of inhibition due to lincomycin could be noted against a cloudy growth background.

EXAMPLE 2

*Lincomycin by fusion*

A 5 mg. sample of N-(trans-4-propyl-1-methyl-L-prolyl)lincosamine dimethyl mercaptal was heated above its melting point in a glass melting point tube. At about 260° C. the odor of methyl mercaptan was noted. After 3 minutes at 260° C. the tube was removed from the bath, cooled and ground up under 10 drops of acetone. The chromatography of filtered solution as described in Example 1 demonstrated the presence of lincomycin.

EXAMPLE 3

*Ethyl N-(trans-4-propyl-1-methyl-L-prolyl)-α-thiolincosaminide (lincomycin C)*

In the manner given in Example 1, N-(trans-4-propyl-1-methyl-L-prolyl)lincosamine diethyl mercaptal, obtained as in Preparation 22, was heated in the presence of p-ethylbenzenesulfonic acid to give ethyl N-(trans-4-propyl-1-methyl-L-prolyl)-α-thiolincosaminide.

EXAMPLE 4

*Butyl N-(trans-4-propyl-1-methyl-L-prolyl)-α-thiolincosaminide*

A mixture of 1.0 g. of N-(trans-4-propyl-1-methyl-L-prolyl)lincosamine dibutyl mercaptal (Preparation 23), 530 mg. of p-toluenesulfonic acid monohydrate and 50 ml. of acetonitrile was heated at reflux for 2 hours. The mixture was then cooled and evaporated to dryness in vacuo. To the residue was added 50 ml. of water and 50 ml. of chloroform plus enough sodium hydroxide solution to make the aqueous phase basic (pH 10). After shaking vigorously, the chloroform phase was separated, dried and evaporated to dryness in vacuo. The thus-obtained residue consisted of 300 mg. of an oil which was chromatographed over 100 g. of silica gel and eluted with a mixture of methanol (1 part) and chloroform (4 parts); sixty 10-ml. fractions were collected after a forerun of 100 ml.

On the basis of thin layer chromatography data, Fractions 8–20 were combined, evaporated and rechromatographed as before over 50 g. of silica gel; twenty 5-ml. fractions were collected after a forerun of 50 ml.

On the basis of thin layer chromatography data (silica gel-methanol:chloroform, 1:6 system), Fraction 9 was evaporated to yield butyl N-(trans-4-propyl-1-methyl-L-prolyl)-α-thiolincosaminide as a white solid which had an activity against *S. lutea* approximately 2 times that of lincomycin.

EXAMPLE 5

*Butyl N-(trans-4-propyl-1-methyl-L-prolyl)-α-thiolincosaminide and lincomycin*

In the manner given in Example 1, N-(trans-4-propyl-1-methyl-L-prolyl)lincosamine butyl methyl mercaptals (as the isomeric mixture produced in Preparation 23) were heated with p-toluenesulfonic acid hydrate in acetonitrile to give mainly butyl N-(trans-4-propyl-1-methyl-L-prolyl)-α-thiolincosaminide and a smaller amount of lincomycin.

In the manner given in Example 2, N-(trans-4-propyl-1-methyl-L-prolyl)lincosamine butyl methyl mercaptals are heated to 270° for a period of 3 minutes, and the reaction mixture is chromatographically separated to give butyl N-(trans-4-propyl-1-methyl-L-prolyl)-α-thiolincosaminide and lincomycin.

EXAMPLE 6

*Hexyl N-(trans-4-propyl-1-methyl-L-prolyl)-α-thiolincosaminide*

In the manner given in Example 1, N-(trans-4-propyl-1-methyl-L-prolyl)lincosamine dihexyl mercaptal was heated under reflux with p-toluenesulfonic acid in acetonitrile to give hexyl N-(trans-4-propyl-1-methyl-L-prolyl)-α-thiolincosaminide.

EXAMPLE 7

*Octadecyl N-(trans-4-ethyl-1-methyl-L-prolyl)-α-thiolincosaminide*

In the manner given in Example 4, N-(trans-4-ethyl-1-methyl-L-prolyl)lincosamine dioctadecyl mercaptal was heated under reflux for 2 hours with p-toluenesulfonic acid hydrate in acetonitrile to give octadecyl N-(trans-4-ethyl-1-methyl-L-prolyl)-α-thiolincosaminide.

EXAMPLE 8

*Octyl N-(trans-4-decyl-1-butyl-L-prolyl)-α-thiolincosaminide*

In the manner given in Example 4, N-(trans-4-decyl-1-butyl-L-prolyl)lincosamine dioctyl mercaptal in acetonitrile was heated under reflux in the presence of p-toluenesulfonic acid hydrate to give octyl N-(trans-4-decyl-1-butyl-L-prolyl)-α-thiolincosaminide.

EXAMPLE 9

*Dodecyl N-(trans-4-octyl-1-ethyl-L-prolyl)-α-thiolincosaminide*

In the manner given in Example 1, N-(trans-4-octyl-1-ethyl-L-prolyl)lincosaminide didodecyl mercaptal in acetonitrile was heated under reflux in the presence of p-toluenesulfonic acid hydrate to give dodecyl N-(trans-4-octyl-1-ethyl-L-prolyl)-α-thiolincosaminide.

Example 10

*Heptyl N-(cis-4-propyl-1-ethyl-L-prolyl)-α-thiolincosaminide*

In the manner given in Example 1, N-(cis-4-propyl-1-ethyl-L-prolyl)lincosamine diheptyl mercaptal in acetonitrile was heated under reflux in the presence of p-toluenesulfonic acid hydrate to give heptyl N-(cis-4-propyl-1-ethyl-L-prolyl)-α-thiolincosaminide.

Example 11

*Decyl N-(trans-4-pentyl-1-decyl-D-prolyl)-α-thiolincosaminide*

In the manner given in Example 1, N-(trans-4-pentyl-1-decyl-D-prolyl)lincosamine didecyl mercaptal in acetonitrile was heated under reflux in the presence of p-toluenesulfonic acid hydrate to give decyl N-(trans-4-pentyl-1-decyl-D-prolyl)-α-thiolincosaminide.

Example 12

*Butyl N-(cis-4-hexyl-1-dodecyl-L-prolyl)-α-thiolincosaminide*

In the manner given in Example 1, N-(cis-4-hexyl-1-dodecyl-L-prolyl)lincosamine dibutyl mercaptal in acetonitrile was heated under reflux in the presence of p-toluenesulfonic acid hydrate to give butyl N-(cis-4-hexyl-1-dodecyl-L-prolyl)-α-thiolincosaminide.

Example 13

*Tetradecyl N-(cis-4-methyl-1-octyl-D-prolyl)-α-thiolincosaminide*

In the manner given in Example 1, N-(cis-4-methyl-1-octyl-D-prolyl)lincosamine ditetradecyl mercaptal in acetonitrile was heated under reflux in the presence of p-toluenesulfonic acid hydrate to give tetradecyl N-(cis-4-methyl-1-octyl-D-prolyl)-α-thiolincosaminide.

Example 14

*Octyl N-(trans-4-decyl-1-butyl-D-prolyl)-α-thiolincosaminide*

In the manner given in Example 4, N-(trans-4-decyl-1-butyl-D-prolyl)lincosamine dioctyl mercaptal in acetonitrile was heated under reflux in the presence of p-toluenesulfonic acid hydrate to give octyl N-(trans-4-decyl-1-butyl-D-prolyl)-α-thiolincosaminide.

Example 15

*Dodecyl N-(trans-4-octyl-1-ethyl-D-prolyl)-α-thiolincosaminide*

In the manner given in Example 4, N-(trans-4-octyl-1-ethyl-D-prolyl)lincosamine didodecyl mercaptal in acetonitrile was heated under reflux in the presence of p-toluenesulfonic acid hydrate to give dodecyl N-(trans-4-octyl-1-ethyl-D-prolyl)-α-thiolincosaminide.

Example 16

*Butyl N-(cis-4-hexyl-1-dodecyl-D-prolyl)-α-thiolincosaminide*

In the manner given in Example 4, N-(cis-4-hexyl-1-dodecyl-D-prolyl)lincosamine dibutyl mercaptal in acetonitrile was heated under reflux in the presence of p-toluenesulfonic acid hydrate to give butyl N-(cis-4-hexyl-1-dodecyl-D-prolyl)-α-thiolincosaminide.

Example 17

*Benzyl N-(trans-4-propyl-1-methyl-L-prolyl)-α-thiolincosaminide*

In the manner given in Example 4, N-(trans-4-propyl-1-methyl-L-prolyl)lincosamine dibenzyl mercaptal in acetonitrile was heated under reflux in the presence of p-toluenesulfonic acid hydrate to give benzyl N-(trans-4-propyl-1-methyl-L-prolyl)-α-thiolincosaminide.

Example 18

*2-thenyl N-(cis-4-butyl-1-hexyl-D-prolyl)-α-thiolincosaminide*

In the manner given in Example 4, N-(cis-4-butyl-1-hexyl-D-prolyl)lincosamine di-2-thenyl mercaptal in acetonitrile was heated under reflux in the presence of p-toluenesulfonic acid hydrate to give 2-thenyl N-(cis-4-butyl-1-hexyl-D-prolyl)-α-thiolincosaminide.

Example 19

*Hexadecyl N-(trans-4-undecyl-1-heptyl-L-prolyl)-α-thiolincosaminide*

In the manner given in Example 4, N-(trans-4-undecyl-1-heptyl-L-prolyl)lincosamine dihexadecyl mercaptal in acetonitrile was heated under reflux in the presence of p-toluenesulfonic acid hydrate to give hexadecyl N-(trans-4-undecyl-1-heptyl-L-prolyl)-α-thiolincosaminide.

Example 20

*Hexyl N-(trans-4-propyl-1-methyl-L-prolyl)-α-thiocelestosaminide*

In the manner given in Example 4, N-(trans-4-propyl-1-methyl-L-prolyl)celestosamine dihexyl mercaptal in acetonitrile was heated under reflux in the presence of p-toluenesulfonic acid hydrate to give hexyl N-(trans-4-propyl-1-methyl-L-prolyl)-α-thiocelestosaminide:

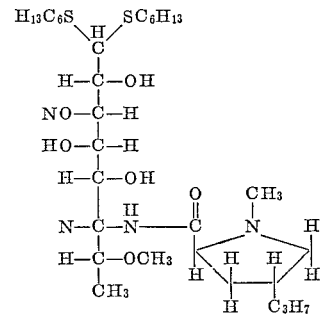

Example 21

*Undecyl N-(trans-4-propyl-1-methyl-L-prolyl)-α-thiocelestosaminide*

In the manner given in Example 4, N-(trans-4-propyl-1-methyl-L-prolyl)celestosamine diundecyl mercaptal in acetonitrile was heated under reflux in the presence of p-toluenesulfonic acid hydrate to give undecyl N-(trans-4-propyl-1-methyl-L-prolyl)-α-thiocelestosaminide.

Example 22

*Hexyl N-(cis-4-butyl-1-ethyl-D-prolyl)-α-thiocelestosaminide*

In the manner given in Example 4, N-(cis-4-butyl-1-ethyl-D-prolyl)celestosamine dihexyl mercaptal in acetonitrile was heated under reflux in the presence of p-toluenesulfonic acid hydrate to give hexyl N-(cis-4-butyl-1-ethyl-D-prolyl)-α-thiocelestosaminide.

Example 23

*Methyl N-(trans-4-propyl-1-methyl-L-prolyl)-α-thiocelestosaminide*

In the manner given in Example 4, N-(trans-4-propyl-1-methyl-L-prolyl)celestosamine dimethyl mercaptal in acetonitrile was heated under reflux in the presence of p-toluenesulfonic acid hydrate to give methyl N-(trans-4-propyl-1-methyl-L-prolyl)-α-thiocelestosaminide.

Example 24

*Dodecyl N-(cis-4-dodecyl-1-propyl-L-prolyl)-α-thiocelestosaminide*

In the manner given in Example 4, N-(cis-4-dodecyl-1-propyl-L-prolyl)celestosamine didodecyl mercaptal in acetonitrile was heated under reflux in the presence of p-toluenesulfonic acid hydrate to give dodecyl N-(cis-4-dodecyl-1-propyl-L-prolyl)-α-thiocelestosaminide.

EXAMPLE 25

*Benzyl N-(cis-4-propyl-1-methyl-D-prolyl)-α-thiocelestosaminide*

In the manner given in Example 4, N-(cis-4-propyl-1-methyl-D-prolyl)celestosamine dibenzyl mercaptal in acetonitrile was heated under reflux in the presence of p-toluenesulfonic acid hydrate to give benzyl N-(cis-4-propyl-1-methyl-D-prolyl)-α-thiocelestosaminide.

EXAMPLE 26

*2-thenyl N-(trans-4-butyl-1-ethyl-L-prolyl)-α-thiocelestosaminide*

In the manner given in Example 4, N-(trans-4-butyl-1-ethyl-L-prolyl)celestosamine di-2-thenyl mercaptal in acetonitrile was heated under reflux in the presence of p-toluenesulfonic acid hydrate to give 2-thenyl N-(trans-4-butyl-1-ethyl-L-prolyl)-α-thiocelestosaminide.

EXAMPLE 27

*Octadecyl N-(cis-4-decyl-1-octyl-D-prolyl)-α-thiocelestosaminide*

In the manner given in Example 4, N-(cis-4-decyl-1-octyl-D-prolyl)celestosamine dioctadecyl mercaptal in acetonitrile was heated under reflux in the presence of p-toluenesulfonic acid hydrate to give octadecyl N-(cis-4-decyl-1-octyl-D-prolyl)-α-thiocelestosaminide.

EXAMPLE 28

*Nonyl N-(trans-4-octyl-1-hexyl-D-prolyl)-α-thiolincosaminide*

In the manner given in Example 4, N-(trans-4-octyl-1-hexyl-D-prolyl)celestosamine dinonyl mercaptal in acetonitrile was heated under reflux in the presence of p-toluenesulfonic acid hydrate to give nonyl N-(trans-4-octyl-1-hexyl-D-prolyl)-α-thiolincosaminide.

EXAMPLE 29

*Butyl N-(trans-4-propyl-1-methyl-L-prolyl)-α-thiocelestosaminide*

In the manner given in Example 4, N-(trans-4-propyl-1-methyl-L-prolyl)celestosamine dibutyl mercaptal in acetonitrile was heated under reflux in the presence of p-toluenesulfonic acid hydrate to give butyl N-(trans-4-propyl-1-methyl-L-propyl)-α-thiocelestrosaminide.

EXAMPLE 30

*Decyl N-(trans-4-pentyl-1-decyl-D-prolyl)-α-thiolincosaminide*

In the manner given in Example 2, N-(trans-4-pentyl-1-decyl-D-prolyl)lincosamine methyl decyl mercaptal was heated above its fusion point and kept in melted form for a period of 3 minutes to give decyl N-(trans-4-pentyl-1-decyl-D-prolyl)-α-thiolincosaminide.

EXAMPLE 31

*Octyl N-(trans-4-heptyl-1-dodecyl-D-prolyl)-α-thiocelestosaminide*

In the manner given in Example 2, N-(trans-4-heptyl-1-dodecyl-D-prolyl)celestosamine methyl octyl mercaptal was heated above its fusion point and kept in melted form for a period of 3 minuptes to give octyl N-(trans-4-heptyl-1-dodecyl-D-prolyl)-α-thiocelestosaminide.

In the manner given in the above examples, other S-substituted 6,8-dideoxy-6-(1,4-dialkyl-2-pyrrolidinecarboxamido)-1-thio-D-erythro-α-D-galacto-octapyranosides and 7-O-methyl derivatives thereof of Formula III can be obtained by heating under reflux a selected mercaptal of Formula II as shown in Example 1. Representative compounds thus obtained include:

hexyl N-(trans-4-propyl-1-methyl-L-prolyl)-α-thiolincosaminide,
octadecyl N-(trans-4-ethyl-1-methyl-L-prolyl)-α-thiolincosaminide,
octyl N-(trans-4-decyl-1-butyl-L-prolyl)-α-thiolincosaminide,
heptyl N-(cis-4-propyl-1-ethyl-L-prolyl)-α-thiolincosaminide,
decyl N-(trans-4-pentyl-1-decyl-D-prolyl)-α-thiolincosaminide,
benzyl N-(trans-4-butyl-1-methyl-L-prolyl)-α-thiolincosaminide,
2-thenyl N-(trans-4-propyl-1-methyl-L-prolyl)-α-thiolincosaminide,
dodecyl N-(trans-4-octyl-1-ethyl-L-prolyl)-α-thiolincosaminide,
butyl N-(cis-4-butyl-1-ethyl-L-prolyl)-α-thiocelestosaminide,
octyl N-(trans-4-heptyl-1-dodecyl-D-prolyl)-α-thiocelestosaminide,
2-thenyl N-(trans-4-octyl-1-methyl-D-prolyl)-α-thiocelestosaminide,
benzyl N-(cis-4-hexyl-1-butyl-D-prolyl)-α-thiocelestosaminide, and the like.

I claim:

1. A process for the production of a 6,8-dideoxy-6-(1,4-dialkyl-L-2-pyrrolidinecarboxamido)-1-thio-D-erythro-α-D-galacto-octopyranoside of Formula I below:

(I)

wherein R is selected from the group consisting of hydrogen and methyl, wherein $R_3$ is selected from the group consisting of alkyl radicals having from 1 to 18 carbon atoms, inclusive, and benzyl and 2-thenyl, wherein $R_4$ and $R_5$ are alkyl radicals having from 1 to 12 carbon atoms, inclusive, which comprises: heating above the melting point and not higher than to 350° C. a compound of Formula II below:

(II)

wherein R, $R_4$ and $R_5$ have the significance of above and wherein $R_1$ and $R_2$ are selected from the same group as $R_3$ with the proviso that at least one of the parameters $R_1$ and $R_2$ is identical with $R_3$, to obtain the corresponding compounds of Formula I above.

2. A process for the production of a 6,8-dideoxy-6-(1,4- dialkyl - L - 2 - pyrrolidinecarboxamido) - 1 - thio - D-erythro-α-D-galacto-octopyranoside of Formula I below:

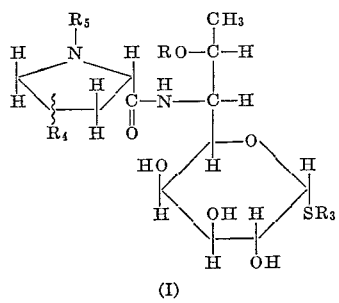

(I)

wherein R is selected from the group consisting of hydrogen and methyl, wherein $R_3$ is selected from the group consisting of alkyl radicals having from 1 to 18 carbon atoms, inclusive, and benzyl and 2-thenyl, wherein $R_4$ and $R_5$ are alkyl radicals having from 1 to 12 carbon atoms, inclusive, which comprises: heating above the melting point and not higher than 350° C. a compound of Formula II below:

(II)

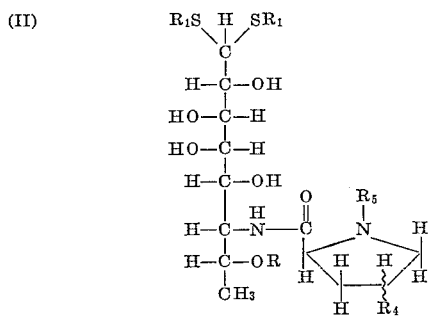

wherein R, $R_4$ and $R_5$ have the same significance as above and wherein $R_1$ is identical with $R_3$, to obtain the corresponding compound of Formula I above.

3. A process for the production of lincomycin which comprises: heating above its melting point and not higher than to 350° C. N-(trans-4-propyl-1-methyl-L-prolyl)-lincosamine dimethyl mercaptal of the formula:

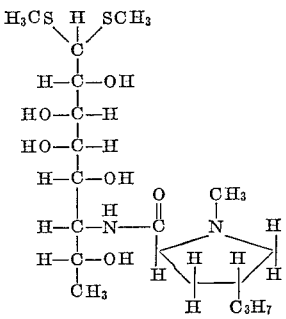

to obtain lincomycin.

4. A process for the production of 6,8-dideoxy-6-(1,4-dialkyl - 2 - pyrrolidinecarboxamido) - 1 - thio - D-erythro-α-D-galacto-octopyranosides of Formula I below:

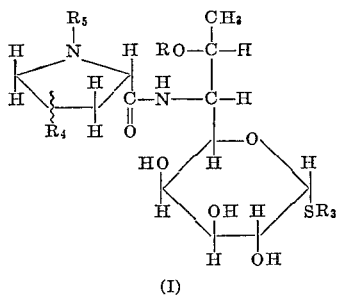

(I)

wherein R is selected from the group consisting of hydrogen and methyl, wherein $R_3$ is selected from the group consisting of alkyl radicals having from 1 to 18 carbon atoms, inclusive, and benzyl and 2-thenyl, wherein $R_4$ and $R_5$ are alkyl radicals having from 1 to 12 carbon atoms, inclusive, which comprises: heating to reflux a mixture of an acid selected from the group consisting of benzenesulfonic acids, alkylsulfonic acids, hydrogen fluoride, hydrogen chloride, hydrogen bromide and sulfuric acid, a compound of Formula II below:

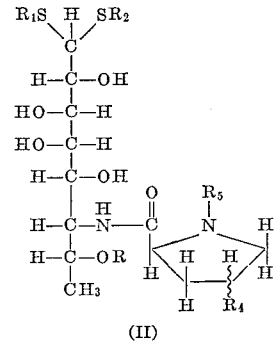

(II)

wherein R, $R_4$ and $R_5$ have the significance of above and wherein $R_1$ and $R_2$ are selected from the same group as $R_3$ with the proviso that at least one of the parameters $R_1$ and $R_2$ is identical with $R_3$ and an organic solvent selected from the group consisting of acetonitrile, tetrahydrofuran, dioxane, benzene, toluene, ethylbenzene, carbontetrachloride and ethylene dichloride, to obtain the corresponding compounds of Formula I above.

5. A process for the production of 6,8-dideoxy-6-(1,4-dialkyl - 2 - pyrrolidinecarboxamido) - 1 - thio - D-erythro-α-D-galacto-octopyranosides of Formula I below:

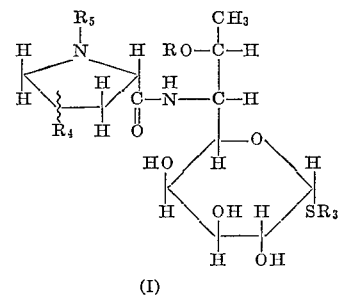

(I)

wherein R is selected from the group consisting of hydrogen and methyl, wherein $R_3$ is selected from the group consisting of alkyl radicals having from 1 to 18 carbon atoms, inclusive, and benzyl and 2-thenyl, wherein $R_4$ and $R_5$ are alkyl radicals having from 1 to 12 carbon atoms, inclusive, which comprises: heating to reflux a mixture of a benzenesulfonic acid, a compound of Formula II below:

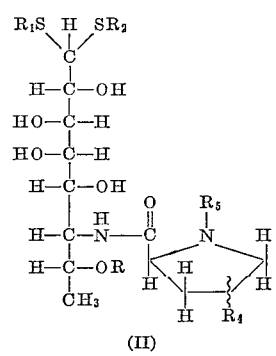

(II)

wherein R, $R_4$ and $R_5$ have the significance of above and wherein $R_1$ is identical with $R_3$ and acetonitrile, to obtain the corresponding compound of Formula I, above.

6. A process for the production of lincomycin which comprises: heating to reflux a mixture of N-(trans-4- propyl-1-methyl-L-prolyl)lincosamine dimethyl mercaptal of formula:

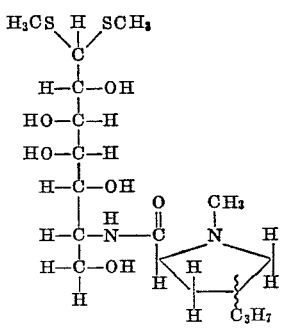

a benzenesulfonic acid and acetonitrile to obtain lincomycin.

7. A process for the production of butyl N-(trans-4-propyl - 1 - methyl-L-prolyl)-α-thiolincosaminide which comprises: heating to reflux a mixture of N-(trans-4-propyl-1-methyl-L-prolyl)lincosamine dibutyl mercaptal, p-toluenesulfonic acid and acetonitrile to give butyl N-(trans-4-propyl-1-methyl-L-prolyl)-α-thiolincosaminide.

8. A process for the production of butyl N-(trans-4-propyl-1-methyl-L-prolyl)-α-thiolincosaminide which comprises: heating to reflux a mixture of N-(trans-4-propyl-1-methyl-L-prolyl)lincosaminie methyl butyl mercaptal, p-toluenesulfonic acid and acetonitrile to give butyl N-(trans-4-propyl-1-methyl-L-prolyl)-α-thiolincosaminide.

No references cited.

LEWIS GOTTS, *Primary Examiner.*

JOHNNIE R. BROWN, *Assistant Examiner.*